US 6,728,837 B2

(12) United States Patent
Wilkes et al.

(10) Patent No.: US 6,728,837 B2
(45) Date of Patent: Apr. 27, 2004

(54) ADAPTIVE DATA INSERTION FOR CACHING

(75) Inventors: John Wilkes, Palo Alto, CA (US); Theodore M. Wong, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 09/985,426

(22) Filed: Nov. 2, 2001

(65) Prior Publication Data

US 2003/0088739 A1 May 8, 2003

(51) Int. Cl.[7] .............................................. G06F 12/00
(52) U.S. Cl. ........................ 711/133; 711/137; 711/144; 711/204; 711/213
(58) Field of Search ................................ 711/133, 137, 711/144, 204, 213

(56) References Cited

U.S. PATENT DOCUMENTS 5,668,968 A * 9/1997 Wu .................................. 711/3
5,717,954 A * 2/1998 Grieff et al. .................. 710/57
5,809,560 A * 9/1998 Schneider .................... 711/204

* cited by examiner

Primary Examiner—Reba I. Elmore

(57) ABSTRACT

A computer system cache monitors the effectiveness of data inserted into a cache by one or more sources to determine which source should receive preferential treatment when updating the cache. The cache may be part of a computer system that includes a plurality of host systems, each host system includes a host cache, connected to a storage system having a storage system cache. Ghost caches are used to record hits from the plurality of host systems performing operations for storing and retrieving data from the storage system cache. The storage system cache includes a cache controller that is operable to calculate a merit figure and determine an insertion point in a queue associated with the storage system cache based on the merit figure. The merit figure is calculated using a weighting algorithm for weighting hits from the plurality of sources recorded in the ghost caches.

30 Claims, 5 Drawing Sheets

ADAPTIVE DATA INSERTION FOR CACHING

FIELD OF THE INVENTION

The invention pertains to the field of computer systems. More particularly, this invention relates to data caching techniques.

BACKGROUND OF THE INVENTION

A typical computer system includes one or more data caches. A data cache is a portion of computer memory that is used to hold (typically) part of the data that is also held on a second computer memory that is typically slower than the memory used for the data cache.

For example, many computer systems contain one or more host systems and one or more storage systems. A storage system usually provides relatively large-scale, non-volatile storage of information that may be accessed by one or more host systems. A host system typically accesses a storage system by performing write and read operations to and from the storage system via a communication link between the host and storage systems.

A typical host system includes a host processor and a host cache (i.e., a higher-level cache). A typical host cache temporarily holds information obtained from a storage system and provides the host processor with relatively fast access to information held in the host cache. A storage system commonly includes a storage medium and a storage system cache. A typical storage system cache (i.e., a lower-level cache) temporarily holds information obtained from the storage medium and provides one or more host systems with relatively fast access to the information contained in the storage system cache. A shared, lower-level cache may include, but is not limited to, a block cache or a file system cache (e.g., a disk array block cache or a file server cache; either may shared by multiple client machines having their own cache) or a memory cache attached to a memory board shared by several central processing unit (CPU) caches in a multiprocessor system.

In general, data is put into a cache so that it can be retrieved (referenced) again in the future, more rapidly than accessing the data from the backing store, which is typically slower to access than the cache memory. Since the size of the cache (i.e., the amount of data it can hold) is typically limited—and much smaller than the lower level data store—it is important that the data kept in the cache is (as far as possible) the data most likely to be re-referenced. This is accomplished by the combination of an insertion policy (which things are to be placed into the cache) and a replacement policy (which things are to be dropped from the cache to make space for new data). A commonly used replacement policy (or replacement algorithm) is to manage the data in the cache by a technique known as Least Recently Used (or LRU)—data that has not been referenced for the longest time is the first to be discarded when new space is needed.

A commonly used insertion policy is to treat all data that is inserted into the cache as likely to be of equal future value (i.e., equally likely to be re-referenced in the time it spends in the cache); thus new data is added at the end furthest away from the "next to be dropped" end of the replacement policy. It is common to implement the resulting cache management data structure (or cache metadata) as a list of pointers to the blocks: at one end (the head) are the pointers to the blocks next to be discarded; at the other end (the tail) are the blocks most recently referenced or inserted. Those skilled in the art will recognize that there are many possible structures that can be used for this metadata, and this is just one example.

Unfortunately, some data in a cache are never referenced during their time in the cache. (The cache lifetime, or cache residency time, is a measure of how long the data resides in the cache before being selected for replacement.) This wastes space in the cache that could have been used to hold other data that is referenced in the future, and thus reduces the effectiveness of the cache. A mechanism that could selectively decide which blocks are worth inserting in the cache (i.e., which ones are more likely to be referenced more often during their lifetime in the cache) could increase the effectiveness of the cache.

Additionally, some data added to a cache is either referenced quickly, or not at all. This means that a mechanism that can selectively decide to insert data into the cache in a way that limits its cache lifetime in the absence of a reference will also enable the space taken up by the data to be reused more quickly, and thus increase the cache's effectiveness.

When multiple clients share a common cache, it has proved difficult to achieve appropriate choices for which data from which client are most likely to be referenced in the future—either by the same client or by other clients. Thus, a mechanism that can provide preferential treatment for cache clients that insert data that is more likely to be referenced is likely to result in a more effective cache.

Data is inserted into a cache by many processes: it can be read in response to a client read from the lower-level store; it can be written to by a client; it can be read-ahead in anticipation that it might soon be requested by a client; and it might be "demoted" by a client from its own cache to the lower-level cache, in case more space is available there. In all cases, the data is retained in the cache in the hope that it will be referenced. However, existing approaches are unable to exploit the fact that different processes may result in cached data with different value—i.e., different likelihood of being referenced in the future.

Similarly, it may also be the case that different clients, using the same insertion processes, may insert data into the cache that has different likelihood of being referenced, yet existing approaches do not distinguish these cases.

All these diverse processes for placing data in the cache are called "insertion sources" in what follows. Those skilled in the art will recognize that many other possibilities for identifying insertion sources exist, and can, be employed in what follows.

As a consequence, methods are needed to identify which data is most likely to be re-referenced in the future, and which insertion sources are most likely to insert data into a cache. Furthermore, methods are needed to guide the replacement policy to selectively favor deleting data that is not likely to be referenced from the cache, and such methods are needed in situations where there are multiple clients sharing a common cache.

SUMMARY OF THE INVENTION

An embodiment of a method for storing data in a cache is disclosed. The method comprises steps of creating at least one ghost cache recording hits from at least one source; calculating a merit figure associated with hits in the at least one ghost cache; and identifying an insertion point in metadata associated with the cache based on the merit figure.

Another embodiment of a method for storing data in a cache is disclosed. The method comprises steps of creating at least one ghost cache recording hits from at least one source; calculating a merit figure associated with hits in the at least one ghost cache; segmenting the cache into a plurality of sections; and identifying an insertion point in metadata associated with one of the plurality of sections based on the merit figure.

A caching system is disclosed that comprises a cache, a cache controller connected to the cache, one or more sources operable to store data in the cache, and at least one ghost cache recording hits from at least one of the sources. The cache controller is configured to calculate a merit figure based on a hit rate in the ghost cache and determine an insertion point in metadata associated with the cache based on the merit figure.

The methods of the present invention include steps that may be performed by computer-executable instructions executing on a computer-readable medium.

In comparison to known prior art, certain embodiments of the invention are capable of achieving certain aspects, including some or all of the following: data can be accessed faster by a cache clients, including those in multi-client systems. Those skilled in the art will appreciate these and other aspects of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
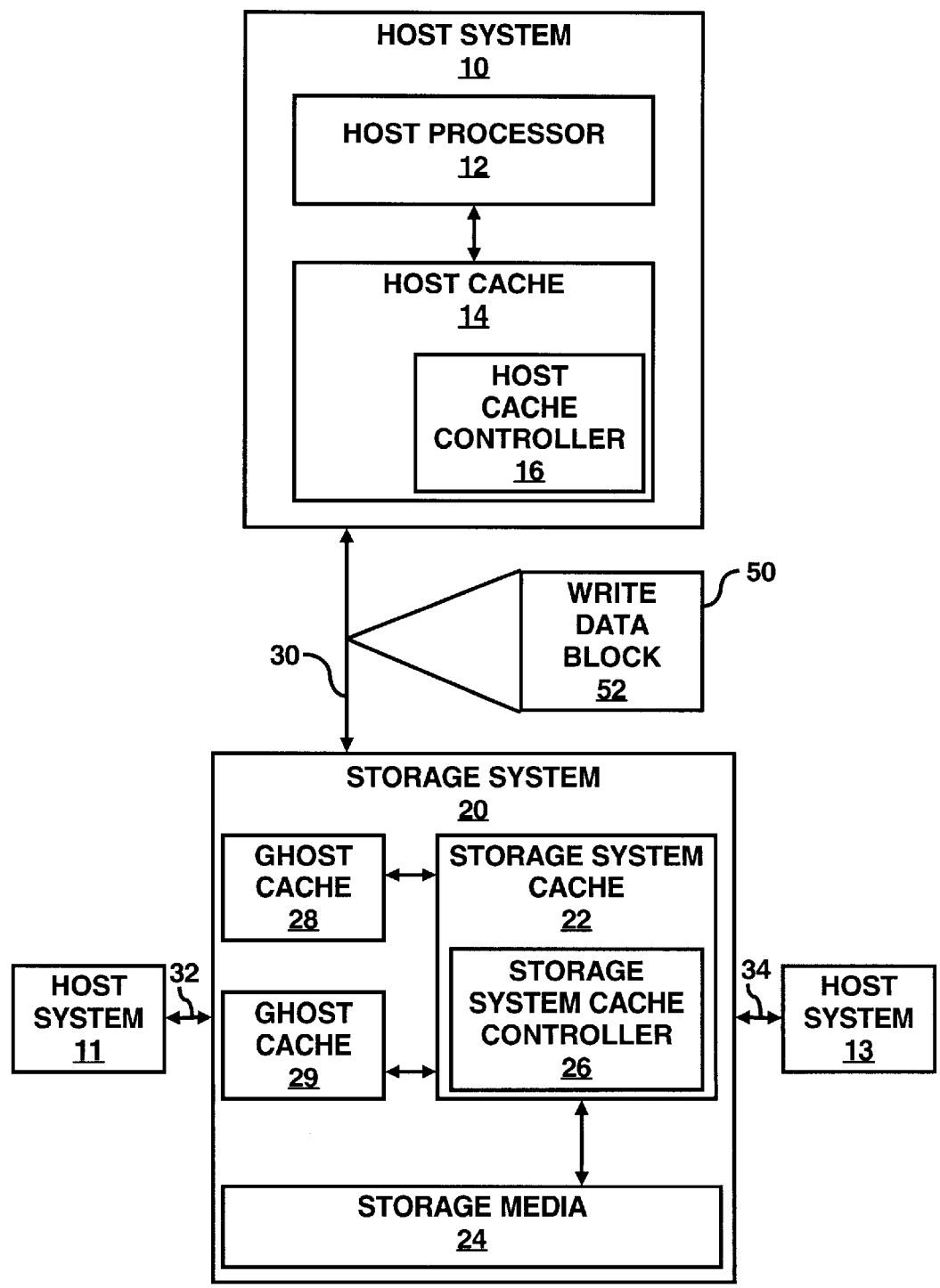
FIG. 1 shows a computer system employing principles of the invention.

A computer system 100 is operable to facilitate exclusive caching techniques that avoid the accumulation of duplicate copies of data in host and storage system caches. FIG. 1 shows the computer system 100 that includes multiple host systems 10, 11 and 13 and a storage system 20 that communicate via communication links 30, 32 and 34, respectively. Each host system, such as shown for the host system 10, includes a host processor (e.g., host processor 12 for the host system 10), a host cache (e.g., host cache 14 for the host system 10) and a host cache controller (e.g., host cache controller 16 for the host system 10). The storage system 20 includes a storage system cache 22, a storage media 24, multiple ghost caches 28–29 and a storage system cache controller 26.

The host cache controller 16 and the storage system cache controller 26 are shown as being incorporated in the host cache 14 and the storage system cache 22. However, it will be apparent to one of ordinary skill in the art that the host cache controller 16 and the storage system cache controller 26 may include controllers separate from their respective caches that conventionally function to store and retrieve data from caches connected thereto. Furthermore, the host cache controller 16 and the storage system cache controller 26 may be implemented with software components, instead of hardware components, or both software and hardware components.

The host system 10 obtains information from the storage system 20 by performing read operations via the communication link 30. The host system 10 transfers information to the storage system 20 by performing write operations via the communication link 30. In addition, the host system 10 demotes information from the host cache 14 to the storage system cache 22 by performing demote operations via the communication link 30. An exemplary demote operation 50 is shown which carries a demoted data block 52 to the storage system 20 via the communication link 30. It will be apparent to one of ordinary skill that each host system in the computer system 100 may function similarly to the host system 10, and the computer system 100 may include one or multiple host systems.

In one embodiment, cached information is organized into sets of information. These sets of information are hereinafter referred to as data blocks but may also be referred to as cache blocks, cache lines, or data lines. A data block hereinafter refers to a block of data having a particular address whether the data block is stored in a cache or storage media.

The host processor 12 accesses data by performing a read or a write to the host cache 14, for example, via the host controller 16. If the data referenced in the read or the write from the host processor 12 is not held in the host cache 14, then the host system 10 may perform a read operation via the communication link 30 to obtain a data block that contains the data needed by the host processor 12 from the storage system 20.

In response to a read operation by the host system 10, the storage system 20 obtains the data block specified in the read operation from storage media 24 and transfers it to the host system 10 via the communication link 30. In other embodiments of the storage system 20, the data block may be stored in the storage system cache 22. For example, recently or frequently accessed data may be stored in the storage system cache 22 or a read-ahead operation may be performed causing the data block to be retrieved from the storage media 24 and stored in the storage system cache 22. The storage system 20 then obtains the data block from the storage system cache 22 and transfers it to the host system 10 via the communication link 30. The data block may then be evicted from the storage system cache 22.

The host system 10 receives the data block from the storage system 20 via the communication link 30 and stores the data block into the host cache 14. The host system 10 then completes the read operation for the host processor 12.

The process of storing a new data block into the host cache 14 may cause a data block to be evicted from the host cache 14 and may cause a write operation to be performed, for example, to the storage system 20. An evicted data block is demoted by transferring it to the storage system 20 via the communication link 30 using a write operation. For example, the write operation 50 includes transmitting the demoted data block 52, which was a dirty data block evicted from the host cache 14, to the storage system 20 for storage in the storage system cache 22.

The storage system 20 handles the write operation 50 by storing the written data block 52 into the storage system cache 22 while performing an eviction, if needed, from the storage system cache 22.

The host cache controller 16 manages the host cache 14. The host cache controller 16 may implement any one or more of a set of known replacement algorithms for selecting data blocks to be evicted from the host cache 14. For example, the host system 10 may implement an LRU replacement algorithm for the host cache 14. Alternatively, the host system 10 may implement a most recently used (MRU) replacement algorithm for the host cache 14. In yet another alternative, the host system 10 may implement a most frequently referenced (MFR) replacement algorithm. These are only examples of suitable replacement algorithms and others may be employed.

The storage system 20 may be any type of storage system which is capable of holding data blocks for access by the host system 10 and which includes a storage system cache 22. In one embodiment, the storage media 24 is a disk drive. In another embodiment, the storage media 24 is an array of disk drives. In yet another embodiment, the storage media 24 is a solid-state memory. In another embodiment, the storage media 24 is a tape. The storage system 20 may implement the functionality of a server wherein the host system 10, as well as other hosts systems on the communication link 30 or other communication links, may access the storage system 20 using any one or more of a wide variety of known client-server communication protocols. Also, the host cache 14 may be a RAM cache, a disk cache, a disk array, or any conventional caching device.

The storage system cache 22 may be employed to hold data blocks that are obtained by read-ahead operations on the storage media 24 as well as to hold the data blocks that are demoted from the host system 10. In one embodiment, data blocks that are demoted from the host system 10 may be stored in any free area in the storage system cache 22. Alternatively, the storage of demoted data blocks may be limited to predetermined portions or sub-areas of the storage system cache 22. The storage system cache 22 may also be employed to hold other data blocks from read operations performed by the host system 10. The storage system cache 22 may be employed to hold other data blocks from write operations performed by the host system 10. The storage system cache 22 may include a disk array, a RAM cache, disk cache, or any conventional caching device.

The storage system cache controller 26 may implement any known data block replacement algorithm for the storage system cache 22. In addition, the storage system cache controller 26 may preferentially keep data blocks in the storage system cache 22 that are being shared by the host systems 10, 11 and 13. For example, the storage system cache controller 26 may select data blocks for eviction from among the unshared data blocks only and select shared data blocks for eviction only if no unshared data blocks remain in the storage system cache 22. Alternatively, the storage system cache controller 26 may take into account the shared status of a data block as only one factor in its replacement algorithm with other factors being the age, time of last update, etc., for the data block. These factors may be weighted in any combination.

The storage system cache controller 26 may create and manage the ghost caches 28 and 29. Every cache has metadata associated with it, which includes information about the blocks of data it contains, such as their access counts, names, etc. A ghost cache is metadata for a virtual cache—e.g., one that may be larger than a physical cache (e.g., the storage system cache 22), or one that may not physically exist, or one that may be a part of a larger cache. In one extreme embodiment, the ghost cache 28 is the metadata for the storage system cache 22 (e.g., when only one insertion source stores data in the physical cache). In a more preferred embodiment, the ghost cache 28 is a set of metadata for a cache that is the same size or larger than the physical cache 22. A ghost cache may operate in parallel to the cache metadata for a real cache, and is typically used to identify possible behaviors that might have occurred if some or all of the real cache had been managed in a different manner, or if there had been a different amount of memory allocated to some or all of the real cache. Those skilled in the art will recognize that there are many types of, and applications for, such ghost caches, and the versions described here are merely exemplary embodiments.

The ghost caches 28 and 29 are used to monitor the behavior of an insertion source. An insertion source is anything that can be monitored and that may cause or may provoke insertions of data into the cache. In various embodiments, a ghost cache may be used for each type of data operation (e.g., read, read-ahead, write, demote, etc.), for each host (e.g., host systems 10, 11 and 13) or for each host/insertion type combination (e.g., reads from host system 10, writes from host system 13, etc.). Therefore, although two ghost caches 28 and 29 are shown, it will be apparent that one or more ghost caches may be provided in the storage system 20. Also, each ghost caches typically stores only metadata, and thus utilizes minimal memory compared to the amount of memory that would be consumed by the cached data itself.

Generally, a ghost cache may be created once, and then it is maintained to monitor hit rates for a particular insertion source, operation type, insertion source/operation type combination, and the like. The hit rates are used to determine an insertion point for future operations. For example, in one embodiment the ghost cache 28 monitors hit rates for blocks that entered the (ghost) cache as a result of write operations, and the ghost cache 29 monitors hit rates for blocks that entered the (ghost) cache as a result of read operations. For example, the data block 52, shown in FIG. 1, is transmitted to the storage system 20 for storage in the storage system cache 22. The ghost cache 28 records a metadata entry for the written block, whether or not it is actually stored in the cache 22. If the host system 10 performs a read operation that requests this written data from the storage system 20, and the metadata in the ghost cache 29 indicates that the block would have been resident had the ghost cache been real, the ghost cache 29 records a hit for that ghost cache. Also, a ghost cache may monitor other types of data operations, such as writes, and the like. Although not shown, hosts 11 and 13 may have two ghost caches each for recording hits associated with similar operation-types.

In another embodiment, a ghost cache may be created for each host. For example, one ghost cache is created for each of hosts 10, 11 and 13, and each records hits for any operation related to blocks that were (or could have been) inserted in the storage system cache 22 by their respective host system. In another embodiment, a ghost cache may record hits for blocks that entered the (ghost) cache as a result of operations of a particular operation type for a particular host.

In still another embodiment a ghost cache may be merged with or split from another ghost cache. For example, if ghost cache 28 is recording hits for blocks inserted into the storage system cache 22 by the host system 10 and the ghost cache 29 is recording hits for blocks inserted into storage system cache 22 by the host system 12, the two ghost caches may be merged if the host systems 10 and 12 are substantially performing the same operations and or number of operations and or their hit rates are comparable. The ghost caches 28 and 29 may subsequently be split if the host systems 10 and 12 cease to perform substantially the same operations and or number of operations and or if their hit rates diverge.

The ghost caches 28 and 29 facilitate the prediction of the hit rates that would have resulted if a large cache (possibly all of the storage system cache 22) had been dedicated solely to servicing cache insertions from one insertion source (e.g., host system 10). This allows calculation of a hit rate for blocks that a particular insertion source (e.g., the host system 10) would have achieved if the insertion source had the entire cache (e.g., the storage system cache 22) all to itself. A hit rate is the total number of cache hits divided by the total number of read requests. (Other operation types may be included beyond read requests: e.g., sometimes write requests may be included in the calculation of hit rate, too.) A hit is a read (respectively, sometimes write) request for (to) data that is stored in the cache.

For example, the ghost cache 28 mimics the cache metadata operations that would have resulted were it to be the real cache metadata structure for the storage system cache 22 being populated by one insertion source. By doing so, the ghost cache 28 is able to provide an accurate estimate of the cache hit rate that would have resulted from subsequent read requests to the storage system cache 22 that had been populated only with blocks inserted by that insertion source (e.g., the host system 10) for the ghost cache 28. Typically, a ghost cache is managed as a simple LRU queue, although any other form of cache metadata, replacement policy, or insertion policy may be used in a ghost cache, and these may even change with time. Those skilled in the art will recognize that a ghost cache is only one possible way of achieving such an estimate; in this invention, any suitable mechanism that provides a reasonable estimate of the cache hit rate can be used; the ghost cache is presented here as just one exemplary method.

In other embodiments, the ghost caches 28 and 29 could also be used to mimic different cache-replacement strategies, as well as different insertion algorithms. Ghost caches obtain estimates of the likely value (i.e., whether it will be read in the future) of inserting a block into the data cache, and of keeping the block in the cache for a longer or shorter period of time. Such predictions have, of necessity, to be based on information from the past and may be determined by analyzing each type of insertion, for each insertion source (e.g., host systems 10, 11 and 13) or for each host/insertion type combination.

The hit rate information obtained by a ghost cache is used to select an insertion point in a queue on subsequent cache insertions from that insertion source. For example, the ghost cache 28 monitors the hit rates for all the read-ahead operations performed by host system 10 (i.e., the insertion source is a read-ahead performed by the host system 10), and the ghost cache 29 stores hit rates for all read-ahead operations performed by the host system 12.

The predicted hit rates associated with each of the insertion sources are used to determine the cache insertion point for subsequent insertions from that insertion source. The calculation of the appropriate insertion point for a given insertion source may be done by comparing the predicted cache hit rate for that insertion source with one or more predicted cache hit rates for other insertion sources, or the actual cache hit rate achieved by the cache. For example, the insertion point can be calculated from the ratio of the predicted cache hit rate ("effectiveness") of a given insertion source compared to the average of the other insertion sources. This comparison and calculation can be performed in any of a number of different ways. The insertion point, for example, may include the head-end or tail-end of an LRU queue in the storage system cache 22. The predicted hit rate value may also be used to determine whether to accept or deny cache insertion. Also, the insertion point may be in different areas of the queue, other than the ends of the queue, depending on the hit rate for the insertion source. For example, the insertion point may be at or in near the middle of the cache metadata (the LRU queue in this example), or at any point along the cache metadata structure, according to the value of the insertion point calculated from the merit figure.

The communication link 30 may be implemented as any type of communication link that is capable of carrying information between the host system 10 and the storage system 20. For example, the communication link 30 may be a system bus or a peripheral bus in a computer system. In another example, the communication link 30 may be a network communication link. The communication link 30 may include a combination of bus and network elements. Also, one or more direct or indirect links may connect the host system 10 and the storage system 20. In another example, the system 100 may be implemented on a chip, such as a central processing unit, and the communication link 30 may be a data path on the chip. The host system 10 and the storage system 20 include the appropriate communication hardware and software elements for performing communication via the particular embodiment of the communication link 30. Furthermore, the system 100 is not limited to a network, computer system or computer chip and is not limited to a storage system. The system 100 can be employed in any environment which may require monitoring of a data source.

Figure 2:
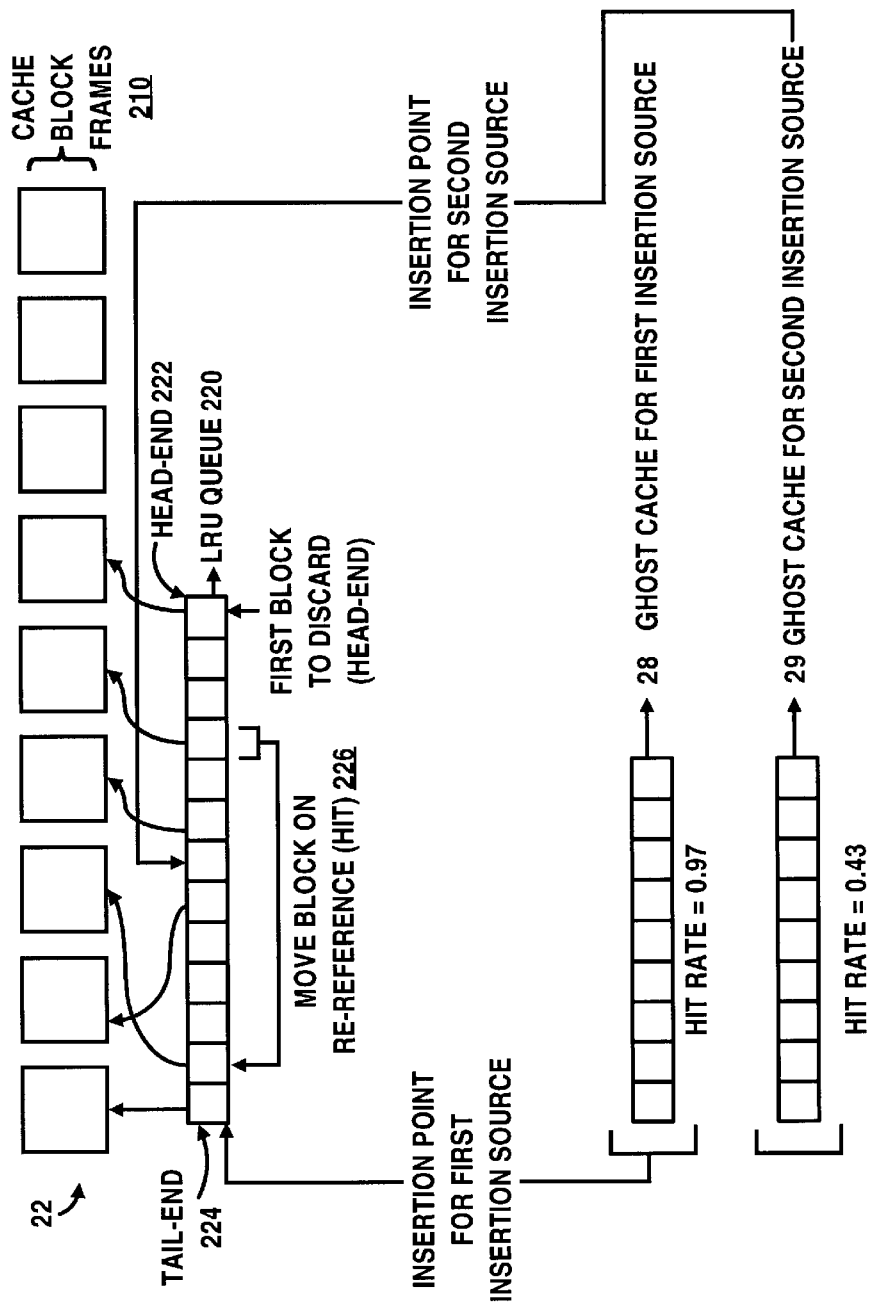
FIG. 2 illustrates an exemplary embodiment of an insertion into the storage system cache shown in FIG. 1.

FIG. 2 illustrates an exemplary embodiment of an insertion into the storage system cache 22. The storage system cache 22 stores data blocks in cache block frames 210. An LRU queue 220 includes pointers to the data blocks in the frames 210. Data blocks with pointers closer to a head-end 222 of the LRU queue 220 will be discarded before data blocks closer to a tail-end 224 of the LRU queue 220. Ghost cache 28 stores meta data for monitoring the hit rate for a first insertion source (e.g., read-ahead operations requested by host system 10 for provoking data to be stored in the storage system cache 22), and the ghost cache 29 stores meta data for monitoring the hit rate for a second insertion source (e.g., read-ahead operations requested by host system 11 for provoking data to be stored in the storage system cache 22). For example, a hit rate of 0.97 is calculated for the first insertion source based on metadata associated with the first insertion source. Therefore, an insertion point for a data block associated with a subsequent insertion in the storage system cache 22 for the first insertion source is towards the tail-end 224 of the LRU queue 220. This data block is less likely to be discarded. A hit rate of 0.43 is calculated for the second insertion source based on meta data associated with the second insertion source. Therefore, an insertion point for a data block associated with a subsequent insertion in the storage system cache 22 for the second insertion source is towards the middle of the LRU queue 220. As illustrated by arrow 226, a hit on a data block already stored in the storage system cache 22 may allow the pointer to that data block to shift towards the tail-end of the LRU queue 220, because it is more likely to be accessed.

Figure 3:
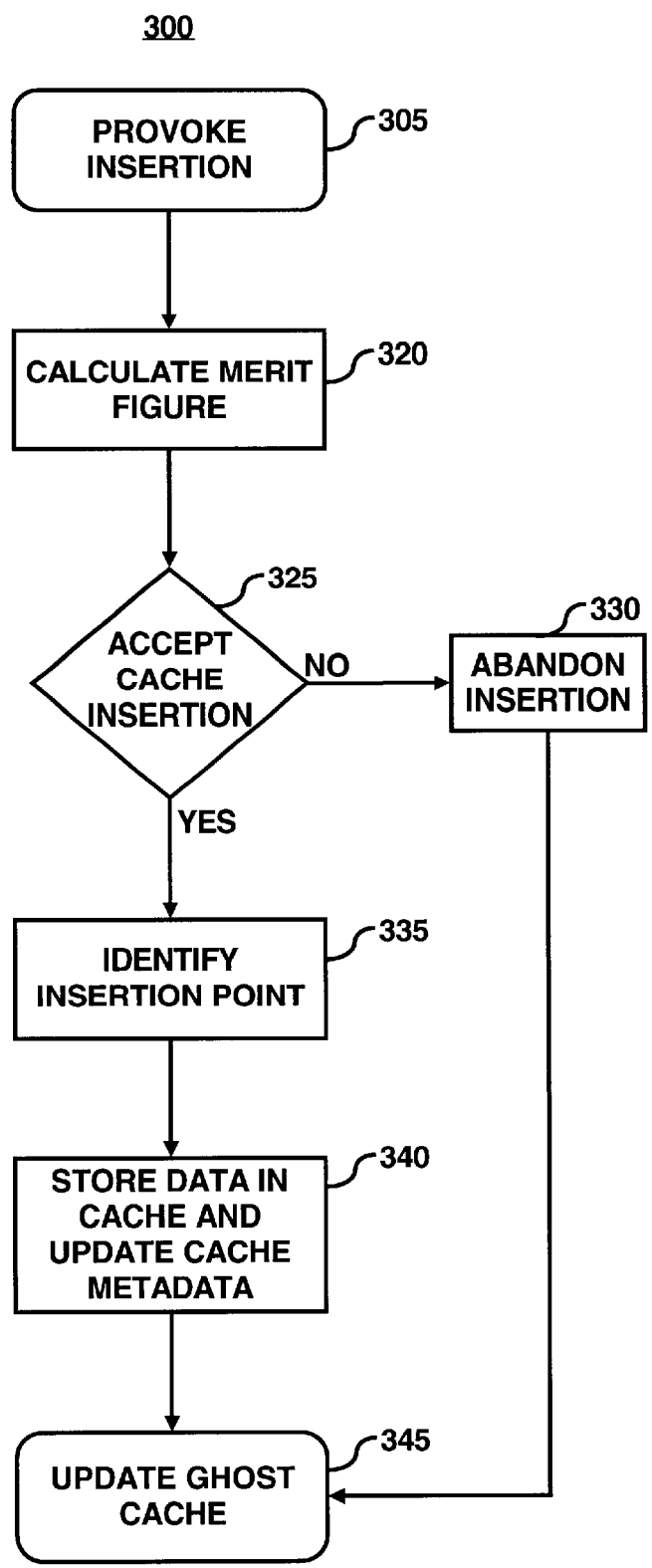
FIG. 3 illustrates an exemplary method for storing data in the storage system cache.

FIG. 3 illustrates an exemplary embodiment of a method 300 for storing data in the storage system cache 22. In step 305, an insertion of a data block in the storage system 22 is provoked by an insertion source (e.g., the first insertion source associated with the ghost cache 28).

In step 320, the storage system cache controller 26 calculates a merit figure based on the hits recorded in the ghost caches (e.g., ghost caches 28 and 29). A weighting algorithm may be used to calculate a merit figure, such as between 0.0 and 1.0 for determining the insertion point in the storage system cache 22 metadata (LRU queue 220). It will be apparent to one of ordinary skill in the art, however, that the merit figure may be normalized to other values. The merit figure represents a relative prediction of how beneficial it will be to accept cache insertions from that particular insertion source (possibly in combination with a given cache-management scheme), compared to other possible insertion sources or other cache management approaches or both. In one embodiment, a sum-weighting algorithm divides the hit rate for a particular insertion source transmitting data to the storage system cache 22 by the sum of the hit rates for all the insertion sources to calculate the merit figure. In another embodiment, a max-weighting algorithm divides the hit rate for the particular insertion source by a hit rate for the insertion source having the highest hit rate to calculate the merit figure. Many other weighting algorithms are possible, as are many other algorithms for determining the merit figure.

Prior to weighting the hit rates (e.g., using a weighting algorithm described above) to calculate the merit figure, the hit rates may be age-weighted to give recent hits greater weight when calculating the merit figure. Age-weighting may be calculated using a constant "a" and the following equation:

$$Hit_{now} = a*Hit_{recent} + (1-a)*Hit_{older}$$

The constant "a" is set based on how much more weight recent hits are given over older hits.

In step 325, a determination is made as to whether or not to accept cache insertion provoked by an insertion source based on the calculated merit figure. The determination may be based on a probability proportional to a function of the merit figure. For example, if the merit figure is below 5% (i.e., below 0.05), then the insertion may be abandoned.

In step 330, if the insertion is not accepted, then the insertion is abandoned. Then, the data to be stored in the storage system cache 22 is discarded, and control passes to step 345.

In step 335, if the insertion is accepted, the insertion point in the metadata structure (e.g., the LRU queue 220) is identified based on the merit figure. For a merit figure in a range from 0 to 1 (e.g., where values closer to 1 indicate that data to be stored in the storage system cache 26 is more likely to be accessed again by a host system), an insertion point closer to the tail-end of an LRU queue may be used for merit figures closer to 1, and an insertion point closer to the head-end of the LRU queue may be used for merit figures closer to 0. It will be apparent to one of ordinary skill in the art that other types of queues may be used in the storage cache system 26. Generally, for merit figures closer to 1, data is inserted in the queue at a point where the data will be stored for a longer period than if the data were inserted at another point in the queue.

In step 340, the data block is inserted into the storage system cache 22 and cache metadata for the data block is updated. Metadata for the data block is set at the identified insertion point in the LRU queue 220. The LRU queue 220 may be a list of pointers to the data block stored in the storage system cache 22.

Those skilled in the art will recognize that this step may include several additional steps, such as dividing up the request into portions that hit in the cache and parts that do not; allocating appropriate memory, reserving data channels, and so on. The metadata update may be as simple as moving the referenced blocks to the tail end of the LRU queue associated with the storage system cache 22, or may include invocation of an insertion point calculation using ghost caches, as described elsewhere in this invention. (That is, a "cache hit" may itself be treated as a kind of insertion source.)

In step 345, the ghost cache 28 is updated so that it can track future hits on the data block for the first insertion source. This is done whether or not the data is stored in the real storage system cache 22.

Additionally, in step 345, if this insertion operation represented a cache hit on data that had been inserted into any of the ghost caches, then all such ghost caches are updated to track the hit. Depending on their algorithms, this may cause the metadata referencing the data to be moved in the ghost cache metadata structures—e.g., if the ghost cache is managed as a LRU queue, then a hit on data in the ghost cache may cause the reference to the hit data to be moved to the tail end of the LRU queue (least likely to be discarded). Those skilled in the art will recognize that many different algorithms and policies may be employed at this point, and the use of an LRU queue is exemplary only.

Figure 4:
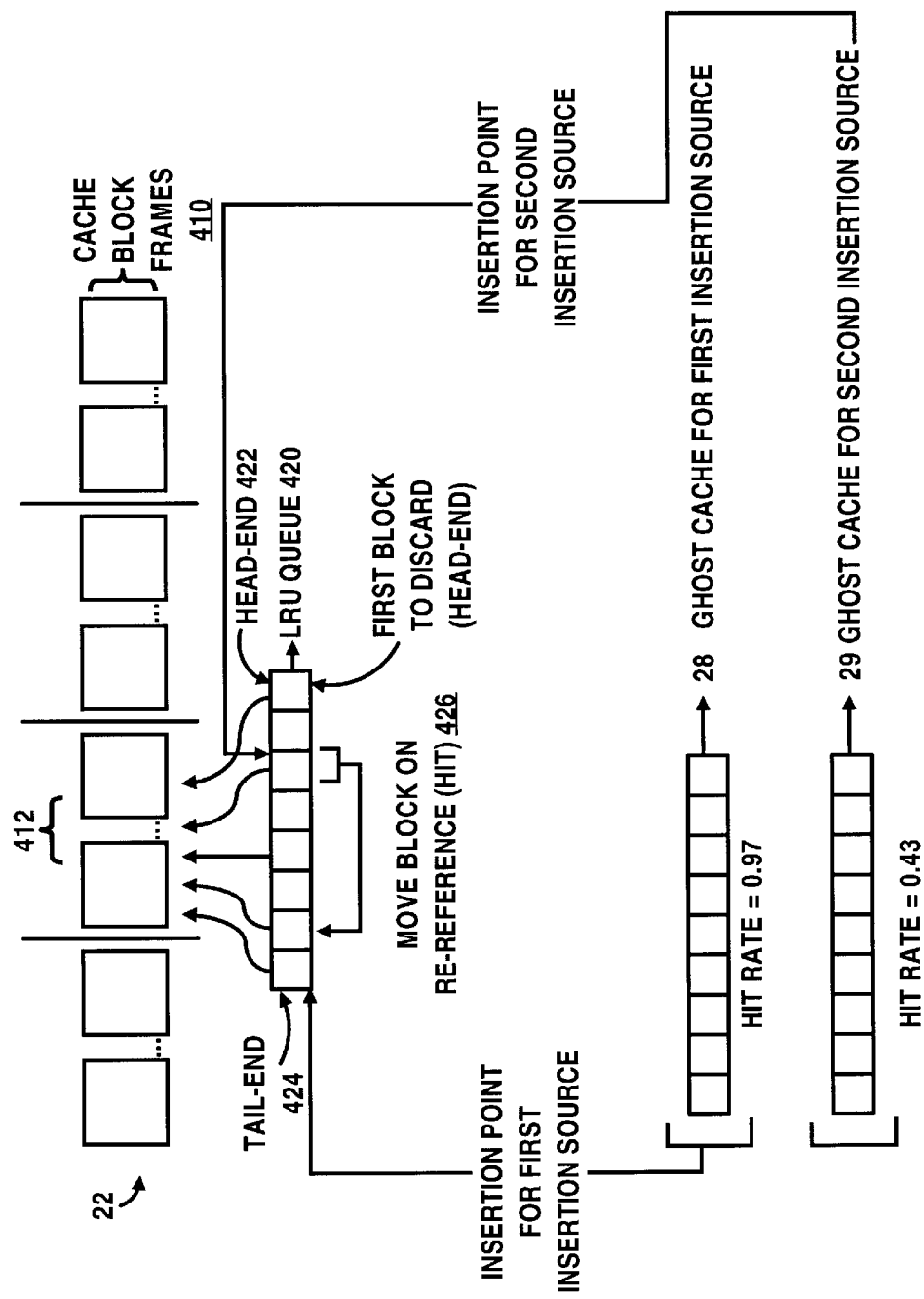
FIG. 4 illustrates an exemplary embodiment of an insertion into a segmented storage system cache.

FIG. 4 illustrates another exemplary embodiment of an insertion into the storage system cache 22. The storage system cache 22 is divided into a number of segments, each including cache block frames 410, that together include all of the data blocks held in the storage system cache 22. In one embodiment, the segments have a fixed size. In another embodiment, the segments have exponentially distributed sizes with the smaller segments positioned towards the head-end of the LRU queue. In still another embodiment, the segment and their sizes may be adaptive, for example, increasing/decreasing the number of segments and determining whether the cache effectiveness increased or decreased.

Each segment may be controlled with a single LRU queue, such as the LRU queue 420 for the segment 412. An insertion point in each LRU queue for each segment is determined as described for the LRU queue 220 shown in FIG. 2. In another embodiment, the storage system cache 22 is controlled by a single LRU queue and a separate data structure containing pointers to the positions in the LRU queue that correspond to the starts of each of the segments may be maintained.

Segmenting the storage system cache 22 improves the rate at which the appropriate insertion point in the cache metadata structure may be found. Segmenting the storage system cache 22 also allows approximation of arbitrary insertion points quickly. For example, finding the point 0.45 along the LRU queue is expensive if it involves looking down a single, long list. Segmenting the storage system cache 22 makes it possible to approximate this (e.g., in a 10-segment cache, 0.45 might be rounded to 0.5, and the entry added to the tail of the LRU queue for the $5^{th}$ segment). The exponential/logarithmic segment sizes are designed to exploit the fact that many proposed insertion points are nearer the head-end of the LRU queue, so the cache metadata is segmented more finely near the head-end of the LRU queue.

The cache 22 may be physically segmented, or the segmentation may be performed entirely within the cache metadata structures held by the cache controller 26, such as the LRU queues 426.

Figure 5:
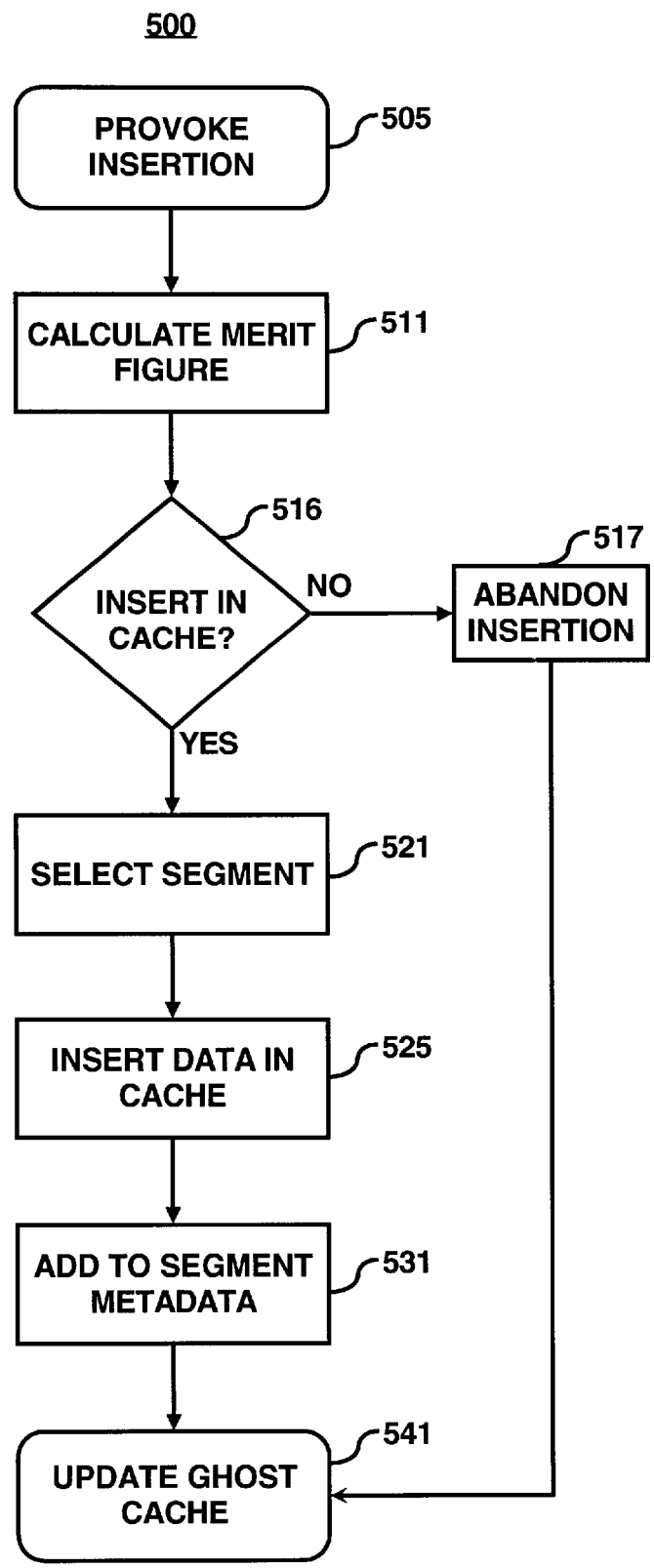
FIG. 5 illustrates an exemplary method for storing data in the segmented storage system cache shown in FIG. 4.

FIG. 5 illustrates an exemplary embodiment of a method 500 for storing data in the storage system cache 22 using the segmented cache shown in FIG. 4.

In step 505, an insertion of a data block in the storage system 22 is provoked by an insertion source (e.g., the first insertion source associated with the ghost cache 28).

In step 511, the storage system cache controller 26 calculates a merit figure for the insertion source, using information held by the ghost cache 28.

In step 516, a determination is made as to whether the merit figure is high enough (e.g., above a value that indicates the data is likely to be accessed again) for the data to be inserted into the cache 22. If not, then the insertion in the main cache 22 is abandoned, at step 517, and control passes to updating the ghost cache in step 541.

In step 521, an insertion point is identified based on the calculated merit figure, and the segment in which the metadata is to be associated is identified from this insertion point. For example, for a merit figure having a range between 0 and 1, a sub-range of values (e.g., 0.0–0.1, 0.2–0.5, 0.6–1.0, and the like) is assigned to a particular segment. Merit figures in the sub-range from 0–0.1 may be assigned to a segment at the head-end of the storage system cache 22. Other sub-ranges of the merit figures are assigned to other segments. The sub-ranges may have the same number of values, may vary in size or may have adaptable sizes depending on whether the segments have the same size, vary in size or are adaptable.

In step 525, data is inserted into a data block frame in the storage system cache 22.

In step 531, the cache metadata for the segment selected in step 521 is updated. Insertion point values within the sub-range associated with the segment may be used to determine the insertion point within the segment, similarly to determining which segment will store the data, if each segment is managed as a separate LRU. Alternatively, the insertion point used may simply be the head or tail of the metadata for the segment.

In step 541, the ghost cache 28 is updated to remember the data block from the insertion source.

Queues other than an LRU queue may be used in the storage system cache 22 for managing data stored in the storage system cache 22 according to the method 300 or the method 500.

The invention is not limited to a storage system cache, and the methods 300, and 500 may be applied to any system with a cache, such as a host system storage controller, a host file buffer cache, a processor cache, a web proxy cache, and the like. Also, identifying data insertion points according to the invention may be based upon predicted hit rates for different sources, different operation types (e.g., read, read-ahead, demote, write, and the like), different cache replacement algorithms (LRU, MFU, etc.), and the like.

In the embodiments presented so far, the cache has used fixed-size data blocks with a single metadata structure associated with each cache entry, and single associativity. It will be apparent to those skilled in the art that this is an exemplary embodiment only, and any cache structure may be used—whether it uses fixed or variable-sized data blocks, one or multiple references to a cache entry, single or multiple associativity.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of storing data in a cache, the method comprising steps of:

receiving a request from a source, the request provoking insertion of data in the cache;

monitoring a hit rate for the source using a ghost cache;

calculating a merit figure for the insertion of data based on the monitored hit rate, the merit figure being a prediction that any data inserted as a result of the request will be referenced again while it resides in the cache; and identifying, based on the merit figure, an insertion point among a plurality of insertion points in a cache metadata structure used to manage the cache, wherein a location of the insertion point in the cache metadata structure affects the length of time that data inserted in the cache will reside in the cache.

2. The method of claim 1, further comprising steps of:

calculating a threshold using an algorithm that includes at least one of a fixed value and a value determined from monitoring a behavior of the cache; and abandoning inserting the data being provoked for insertion in the cache in response to the merit figure being below the threshold.

3. The method of claim 2, further comprising steps of:

writing the data being provoked for insertion in the cache in response to the merit figure being above the threshold; and updating a ghost cache, wherein the updated ghost cache is configured to track hits on the written data.

4. The method of claim 1, further comprising steps of:

receiving a reference for data from the source, a reference being one of a read request, a readahead request and a write request; and updating any ghost cache associated with the referenced data in response to the referenced data being recorded in the ghost cache.

5. The method of claim 4, wherein the step of updating any ghost cache further comprises updating a metadata structure associated with each ghost cache.

6. The method of claim 5, wherein the metadata structure associated with each ghost cache includes an LRU queue.

7. The method of claim 1, wherein the cache metadata structure includes an LRU queue.

8. The method of claim 1 wherein the source is one of a device operable to request an operation for referencing data in the cache; an operation referencing data in the cache and a combination of the device and operation.

9. The method of claim 1, wherein the step of calculating a merit figure further comprises calculating the merit figure using an algorithm that includes one of a weighting; normalizing step; and weighting and normalizing.

10. The method of claim 9, wherein the weighting includes a sum-weighting algorithm dividing a hit rate for a ghost cache by the sum of hit rates for a plurality of ghost caches.

11. The method of claim 10, where in the weighting includes a max-weighting algorithm dividing a hit rate for a ghost cache by a hit rate for a selected one of a plurality of ghost caches.

12. The method of claim 11, wherein the selected ghost cache is the one of the plurality of ghost caches with the highest hit rate.

13. The method of claim 9, wherein the weighting includes an age-weighting algorithm that gives recent hit rates greater weight when calculating the merit figure.

14. A method of storing data in a cache, the method comprising steps of:

monitoring a hit rate for a source using a ghost cache;

receiving a request from the source, the request provoking insertion of data in the cache;

calculating a merit figure for the insertion based on the monitored hit rate, the merit figure being a prediction that the data inserted as a result of the request will be referenced again while it resides in the cache;

segmenting a cache metadata structure for managing the cache into a plurality of sections; and identifying, based on the merit figure, an insertion point among a plurality of insertion points in the cache metadata structure, wherein a location of the insertion point affects a length of time data inserted in the cache will reside in the cache.

15. The method of claim 14, wherein the step of identifying an insertion point comprises selecting one of the plurality of sections for inserting metadata.

16. The method of claim 15, wherein the selection includes an extreme outer position of the selected section.

17. The method of claim 14, further comprising steps of:

calculating a threshold using an algorithm that includes at least one of a fixed value and a value determined from monitoring a behavior of the cache; and abandoning inserting the data being provoked for insertion in the cache in response to the merit figure being below the threshold.

18. The method of claim 17, further comprising steps of:

writing the data being provoked for insertion in the cache in response to the merit figure being above the threshold; and updating a ghost cache, wherein the updated ghost cache is configured to track hits on the written data.

19. The method of claim 14, further comprising steps of:

receiving a reference for data from the source, a reference being one of a read request and a write request; and updating any ghost cache associated with the referenced data in response to the referenced data being recorded in the ghost cache.

20. The method of claim 14, wherein the step of segmenting the cache further comprises segmenting the cache into sections having adaptive sizes.

21. The method of claim 14, wherein the step of segmenting the cache further comprises segmenting the cache into a fixed number of end-to-end sections, each section having a fixed size.

22. A caching system comprising:

a cache, a cache controller controlling the cache, and a plurality of sources operable to provoke storing data in the cache, and at least one ghost cache monitoring a hit rate for at least one of the plurality of sources, wherein the cache controller is configured to calculate a merit figure based on the monitored hit rate and is configured to determine an insertion point in a metadata structure for managing the cache based on the merit figure.

23. The caching system of claim 22, wherein the metadata structure includes at least one queue for determining the order that data is discarded from the cache.

24. The caching system of claim 23, wherein the cache controller determines an insertion point in the queue in response to one of a read operation, write operation, readahead operation, and a demotion operation being performed by the at least one of the plurality of sources.

25. The caching system of claim 12, wherein the metadata for the cache is segmented into a plurality of sections, and the metadata structure for at least one section is a queue for determining the order that data is discarded from the section.

26. An apparatus comprising:

means for receiving a request from a source, the request provoking insertion of data in a cache;

means for monitoring a hit rate for the source using a ghost cache;

means for calculating a merit figure for the insertion of data based on the monitored hit rate, the merit figure being a prediction that any data inserted as a result of the request will be referenced again while it resides in the cache; and means for identifying, based on the merit figure, an insertion point among a plurality of insertion points in a cache metadata structure means for managing the cache, wherein a location of the insertion point in the cache metadata structure means affects the length of time that data inserted in the cache will reside in the cache.

27. The apparatus of claim 26, further comprising ghost cache means for monitoring a hit rate for an insertion source, wherein the means for calculating a merit figure is operable to calculate the merit figure based on the monitored hit rate.

28. The apparatus of claim 26, further comprising means for segmenting the metadata structure means into a plurality of segments, wherein the means for identifying an insertion point is operable to identify an insertion point in one of the plurality of segments.

29. The apparatus of claim 26, further comprising:

means for calculating a threshold using an algorithm that includes at least one of a fixed value and a value determined from monitoring a behavior of the cache; and means for abandoning inserting the data being provoked for insertion in the cache in response to the merit figure being below the threshold.

30. The apparatus of claim 29, further comprising:

means for writing the data being provoked for insertion in the cache in response to the merit figure being above the threshold; and means for updating the ghost cache means, wherein the updated ghost cache means is operable to track hits on the written data.

* * * * *